US011292132B2

(12) United States Patent
Mao et al.

(10) Patent No.: US 11,292,132 B2
(45) Date of Patent: Apr. 5, 2022

(54) ROBOT PATH PLANNING METHOD WITH STATIC AND DYNAMIC COLLISION AVOIDANCE IN AN UNCERTAIN ENVIRONMENT

(71) Applicant: EDDA TECHNOLOGY, INC., Princeton, NJ (US)

(72) Inventors: Yuanfeng Mao, Mt Laurel, NJ (US); Guo-Qing Wei, Plainsboro, NJ (US); Li Fan, Belle Mead, NJ (US); Xiaolan Zeng, Princeton, NJ (US); Jianzhong Qian, Princeton Junction, NJ (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 130 days.

(21) Appl. No.: 16/882,960

(22) Filed: May 26, 2020

(65) Prior Publication Data
US 2021/0370510 A1 Dec. 2, 2021

(51) Int. Cl.
*B25J 9/16* (2006.01)
*B25J 13/08* (2006.01)

(52) U.S. Cl.
CPC .......... *B25J 9/1666* (2013.01); *B25J 9/1697* (2013.01); *B25J 13/086* (2013.01)

(58) Field of Classification Search
CPC ....... B25J 9/1666; B25J 9/1697; B25J 13/086
USPC ................................................ 700/245–264
See application file for complete search history.

(56) References Cited

U.S. PATENT DOCUMENTS

| 5,983,161 A * | 11/1999 | Lemelson ............ G07C 5/0891 701/301 |
| 6,004,016 A * | 12/1999 | Spector .................. B25J 9/1666 700/247 |
| 6,023,645 A * | 2/2000 | Harima ...................... B25J 9/00 700/250 |
| 8,311,731 B2 * | 11/2012 | Sugiura .................. B25J 9/1666 701/301 |
| 8,761,990 B2 * | 6/2014 | Chrysanthakopoulos ................... G05D 1/0274 701/26 |
| 8,793,069 B2 * | 7/2014 | Kuroda ................... G01S 17/66 701/519 |
| 9,278,452 B2 * | 3/2016 | Brandenberger .. G05B 19/4061 |
| 9,707,681 B2 * | 7/2017 | Davidi .................. B25J 9/1682 |
| 10,606,269 B2 * | 3/2020 | Millard ................ G05D 1/0274 |
| 10,788,836 B2 * | 9/2020 | Ebrahimi Afrouzi ........................ G05D 1/0212 |
| 11,059,174 B2 * | 7/2021 | Zhou ........................ B25J 9/163 |

(Continued)

*Primary Examiner* — Jaime Figueroa
(74) *Attorney, Agent, or Firm* — Venable LLP (57) ABSTRACT

The present disclosure relates to robot path planning. Depth information of a plurality of obstacles in an environment of a robot are obtained at a first time instance. A static distance map is generated based on the depth information. A path is computed for the robot based on the static distance map. At a second time instant, depth information of one or more obstacles is obtained. A dynamic distance map is generated based on the one or more obstacles, wherein for each obstacle that satisfies a condition: a vibration range of the obstacle is computed based on a position of the obstacle and the static distance map, and the obstacle is classified as a dynamic obstacle or a static obstacle based on a criterion associated with the vibration range. A repulsive speed of the robot is computed based on the dynamic distance map to avoid the dynamic obstacles.

20 Claims, 9 Drawing Sheets

(56) References Cited

U.S. PATENT DOCUMENTS

| | | | |
|---|---|---|---|
| 2006/0111841 A1* | 5/2006 | Tseng | B60R 1/00 |
| | | | 701/301 |
| 2008/0234864 A1* | 9/2008 | Sugiura | B25J 9/1666 |
| | | | 700/255 |
| 2009/0254235 A1* | 10/2009 | Kuroda | G01S 11/12 |
| | | | 701/23 |
| 2012/0253582 A1* | 10/2012 | Chrysanthakopoulos | |
| | | | G05D 1/024 |
| | | | 701/26 |
| 2015/0251315 A1* | 9/2015 | Brandenberger | G01N 35/0099 |
| | | | 700/255 |
| 2017/0178352 A1* | 6/2017 | Harmsen | G06T 17/05 |
| 2020/0225673 A1* | 7/2020 | Ebrahimi Afrouzi | |
| | | | G05D 1/0214 |

* cited by examiner

ROBOT PATH PLANNING METHOD WITH STATIC AND DYNAMIC COLLISION AVOIDANCE IN AN UNCERTAIN ENVIRONMENT

BACKGROUND OF THE INVENTION

1. Field of the Invention

The present disclosure relates to a system and method of robot path planning with obstacle avoidance. In particular, the present disclosure is related to a method for planning movements of a robotic arm while avoiding static and dynamic obstacles in an uncertain environment.

2. Description of Related Art

Robotic path planning methods try to find a trajectory of robot motion from an initial position to a goal position. For a robotic arm having multiple joints, the degrees of freedom (DOF) in the motion equals to the number of joints. Therefore, there are as many possible moves as the number of joints for each movement. Generally, it may be required that the motion be smooth, the length of trajectory be short, there be no singularities in the path, and obstacles be avoided. Existing path planning methods may be categorized into two types: grid-based path planning and artificial potential field-based path planning. Grid-based path planning is usually a global path planning method which uses priori environment information to create the best possible path, while artificial potential field-based path planning is usually a local path planning method which recalculates a path to replace the initial plan in order to avoid obstacles whose locations are changing relative to the robot over time. Such obstacles may be called dynamic obstacles in the sequel. In grid-based path planning methods, the continuous space of joint angles may be discretized as a high-dimensional grid. The path planning may be performed in the grid of the joint angle space. In artificial potential field-based path planning methods, the minimum Euclidean distances between robot and obstacles in the Cartesian space may be determined with Gilbert-Johnson-Keerthi (GJK) algorithm. A repulsive speed may be generated by processing the Euclidean distances and used to activate the robotic arm to avoid collision with the obstacles.

Grid-based path planning methods, such as the A* algorithm explore all possible moves in the grid by minimizing a cost function. The generated path is unique. However, the planning process may be slow, since all neighbors in the grid may need to be explored. Therefore, such planning methods may not guarantee real time adjustment of trajectory to avoid collision with a moving obstacle if the obstacle is already close to the robotic arm and the motion is fast. Artificial potential field-based path planning methods explore all obstacles that are within a safety distance margin from the robotic arm and generate a repulsive speed to move away from the obstacles based on the minimum distance from each obstacle. The speed generation process is fast. However, the robot may be trapped in the middle of obstacles, since the individual repulsive speed for each obstacle may cancel each other, resulting a combined null repulsive speed, i.e., no motion of robot.

Therefore, it is highly desirable to provide a flexible path planning method that may consider both a static environment and dynamic obstacles and react to moving obstacles and re-plans a path instantly.

SUMMARY

The teachings disclosed herein relate to methods, systems, and programming for robot path planning. One aspect of the present disclosure provides for a method implemented on a machine having at least one processor, storage, and a communication platform capable of connecting to a network for robot path planning. The method comprises the steps of: obtaining, at a first time instant, depth information of a plurality of obstacles in an environment of a robot; generating a static distance map based on the depth information of the plurality of obstacles; computing, in accordance with a model, a path for the robot based on the static distance map; obtaining, at a second time instant, depth information of one or more obstacles in the environment of a robot; generating a dynamic distance map based on the one or more obstacles; for each of the one or more obstacles that satisfy a condition computing a vibration range of the obstacle based on a position of the obstacle and the static distance map, and classifying the obstacle as one of a dynamic obstacle and a static obstacle based on a criterion associated with the vibration range; and calculating a repulsive speed of the robot based on the dynamic distance map, the repulsive speed corresponding to a speed at which the robot deviates from the path to avoid each of the dynamic obstacles.

By one aspect of the present disclosure, there is provided a system for robot path planning. The system comprises a processor configured to: obtain, at a first time instant, depth information of a plurality of obstacles in an environment of a robot; generate a static distance map based on the depth information of the plurality of obstacles; compute, in accordance with a model, a path for the robot based on the static distance map; obtain, at a second time instant, depth information of one or more obstacles in the environment of a robot; generate a dynamic distance map based on the one or more obstacles; for each of the one or more obstacles that satisfy a condition compute a vibration range of the obstacle based on a position of the obstacle and the static distance map, and classify the obstacle as one of a dynamic obstacle and a static obstacle based on a criterion associated with the vibration range; and calculate a repulsive speed of the robot based on the dynamic distance map, the repulsive speed corresponding to a speed at which the robot deviates from the path to avoid each of the dynamic obstacles.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

By one aspect of the present disclosure, there is provided a non-transitory machine-readable medium having information recorded thereon for robot path planning, wherein the information, when read by a machine, causes the machine to perform the steps of: obtaining, at a first time instant, depth information of a plurality of obstacles in an environment of a robot; generating a static distance map based on the depth information of the plurality of obstacles; computing, in accordance with a model, a path for the robot based on the static distance map; obtaining, at a second time instant, depth information of one or more obstacles in the environment of a robot; generating a dynamic distance map based on the one or more obstacles; for each of the one or more obstacles that satisfy a condition computing a vibration range of the obstacle based on a position of the obstacle and the static distance map, and classifying the obstacle as one of a dynamic obstacle and a static obstacle based on a criterion associated with the vibration range; and calculating a repulsive speed of the robot based on the dynamic distance map, the repulsive speed corresponding to a speed at which the robot deviates from the path to avoid each of the dynamic obstacles.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

Aspects of the present disclosure described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The present disclosure is directed to a method and system for robot path planning while avoiding obstacles. Specifically, the present disclosure is directed to a system and method of planning a path for a robotic arm having multiple joints while avoiding obstacles in an uncertain environment. By uncertain environment it is meant that objects in the environment may change their locations. There may be new objects moving into the environment or existing objects moving out of the environment. A robotic arm as referred to herein is an arm of a robot having a plurality of segments. A pose (i.e., position and orientation) of the robotic arm may be determined by a plurality of values (e.g., angle values) each of which corresponds to an angle formed between consecutive operable segments of the robotic arm.

Figure 1:
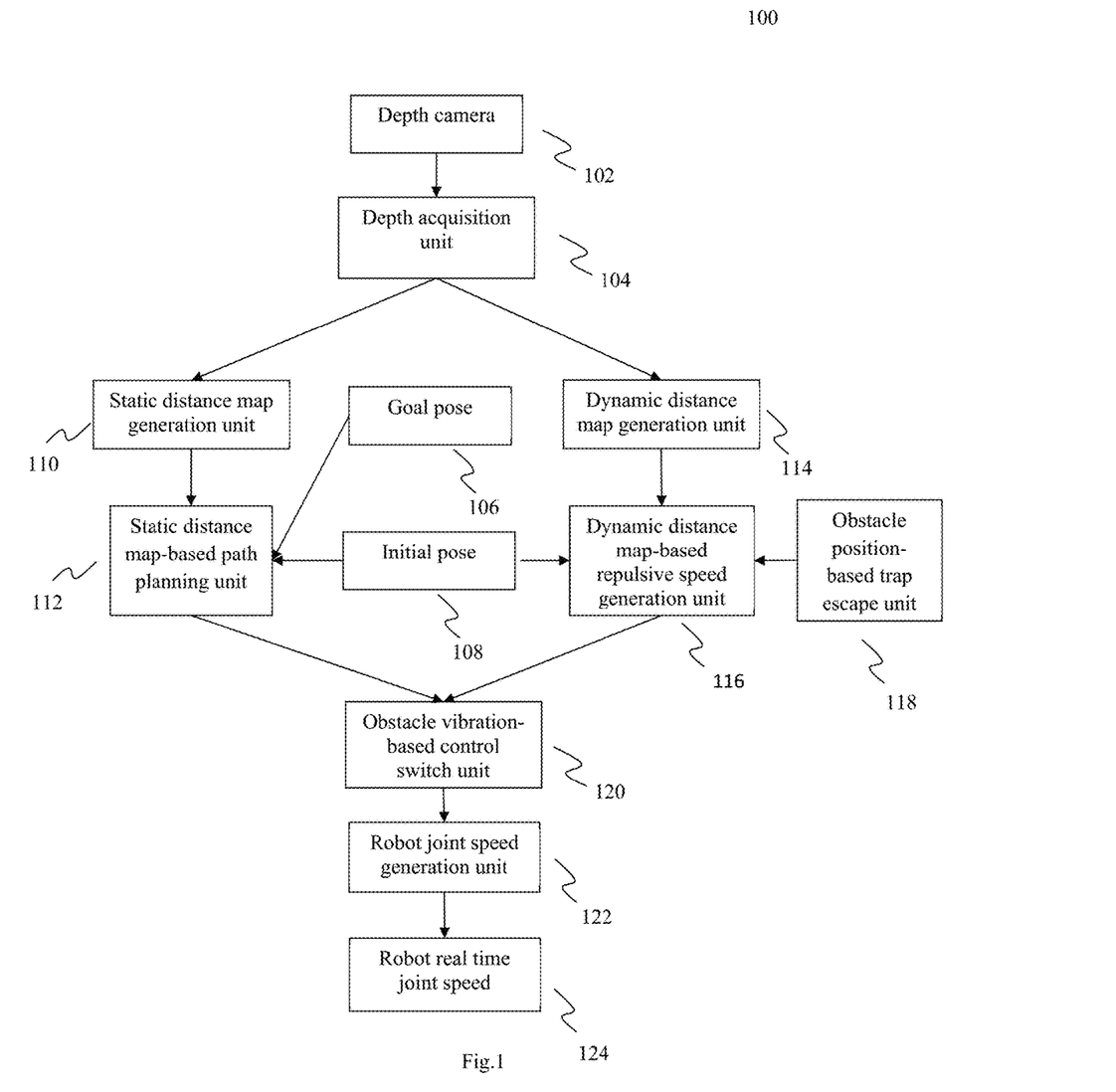
FIG. 1 depicts an exemplary system diagram for robot path planning and collision avoidance.

FIG. 1 shows an exemplary system diagram 100 for facilitating robot path planning, i.e., robotic arm path planning, according to an embodiment of the present teaching. The system 100 includes a depth camera 102, a depth acquisition unit 104, a goal pose 106, an initial pose 108, a static distance map generation unit 110, a static distance map-based path planning unit 112, a dynamic distance map generation unit 114, a dynamic distance map-based repulsive speed generation unit 116, an obstacle position-based trap escape unit 118, an obstacle vibration-based control switch unit 120, and a robot joint speed generation unit 122. The output of the joint speed generation unit is the real time joint speed 124 of the robot.

As stated above, by one embodiment of the present disclosure, a robotic arm may have multiple joints. Specifically, the robot's arm may include multiple segments or links, wherein a connection between adjacent segments or links is referred to as a joint. Typical robots may have 6 or 7 joints, meaning that the robot may have 6 or 7 degrees of freedom (DOF) in movement. The links of a robot are rigid bodies. The representation of a robot arm may include, but not limit to, Computed Aided Design (CAD) model, primitive shapes (i.e. cylinders, circles), and finite number of points on the robot surface. The surface points used to represent a robot arm are referred to as the robot representative points. The robot's initial pose (i.e., position and orientation) 108 and goal pose 106 may be characterized by angles formed between the joints (referred to herein as joint angles). It must be appreciated that the robot's arm may include an end-effector (i.e., a device or tool connected at an end of the robot's arm). The goal pose 106 in joint angles may be computed from the desired end-effector's pose (position and orientation) based on robot inverse kinematics. Please note that the initial pose may not necessarily only refer to a fixed starting pose of the robot. It may also refer to any position during the robot motion according to a planned path when a dynamic moving obstacle is detected and a re-planning of robot motion is needed. The robot position at which the re-planning will be made will be treated as the new initial pose, since it is the starting position for a new trajectory planning. The same may apply to the goal pose. The goal pose may refer to any new goal position when the target is detected to be moving and thus a re-planning is needed.

The structural information of a robot working environment may be perceived by a depth measurement device 102, including, but not limited to, depth cameras, stereo vision systems, laser range sensors. The structure information in the form of depth data may be acquired by a depth acquisition unit 104. Specifically, the objects in the environment may be perceived as finite number of points which have a numerical value associated with them, that number being the distance or "depth" from the origin of the depth measurement device along the view direction (z-direction). The depth acquisition unit may use the depth data to compute the complete 3-Dimensional (3D) coordinates (x-y-z) of a point in the coordinate system of the depth measurement device. After proper calibration, the 3D measurements may be transformed into the robot coordinate system. The 3D information may be used to generate a static distance map by the static distance map generation unit 110 and a dynamic distance map by the dynamic distance map generation unit 114. A static distance map may store the minimum distance from any 3D point in the robot space to static objects (called static obstacles), while a dynamic distance map may store the minimum distance from any 3D point in the robot space to moving obstacles (which may also be called dynamic obstacles below). The static distance map may be generated at the beginning of a path-planning e.g., based on depth information acquired at a first instance, while dynamic distance maps may be generated at a high frequency, i.e., once every second e.g., in a continuous manner in subsequent time instances. Details of how static and dynamic distance maps may be generated are not within the scope of the present invention, and are thus not described here.

Obstacles with fixed locations or small range of back-and-forth motion (here referred to as vibration) may be perceived as static obstacles, while other moving obstacles may be perceived as dynamic obstacles. The vibration range of an obstacle refers to the range of location change. For example, a patient lying on a surgical bed may be considered as being vibrating (or moving) within certain range due to breathing. Due to the small range of motion, such a patient may be perceived as a static obstacle rather than a dynamic obstacle. The details of classifying obstacles into the two types will be described later in the disclosure.

The static distance map-based path planning unit 112 may plan for a collision-free robot trajectory from initial pose 108 to goal pose 106. Robot path planning may usually be performed in a discretized space of joint angles. In the discretized joint angle space, a joint angle configuration may also be referred to as a node in the grid of joint angles. The initial pose may thus be referred to as the initial node and the goal pose as the goal node. The path planning problem becomes that of finding a path starting from the initial node in the grid to the goal node in the grid while satisfying certain criteria. The static distance map-based path planning unit 112 may be based on a general grid-based path planning algorithm such as RRT and A*. The found path may be further smoothed by a path smoothing algorithm to generate a smooth trajectory. The path smoothing algorithm may be an interpolation-based or optimization-based algorithm. As described next, the static distance map-based path planning unit 112 may be referred to as path planning unit in short.

Parallel to the path planning unit 112, the dynamic distance map-based repulsive speed generation unit 116 may generate a repulsive speed corresponding to a robot's current pose when a dynamic obstacle is detected. As stated previously, the current pose may become a new initial pose when a re-planning is made. In what follows, the dynamic distance map-based repulsive speed generation unit 116 may be referred to as repulsive speed generation unit in short. The obstacle position-based trap escape unit 118 may generate an escape speed on top of repulsive speed to help robot escape from being trapped by the obstacles. The obstacle vibration-based control switch unit 120 may determine the vibration range of obstacle points and switch between path planning unit 112 and repulsive speed generation unit 116. Details regarding the path planning unit 112 and repulsive speed generation unit 116 will be described later in the disclosure. The robot joint speed generation unit 122 may generate real time robot joint speed based on whether the input is a joint space trajectory (output of 112) or repulsive speed (output of 116).

Figure 2:
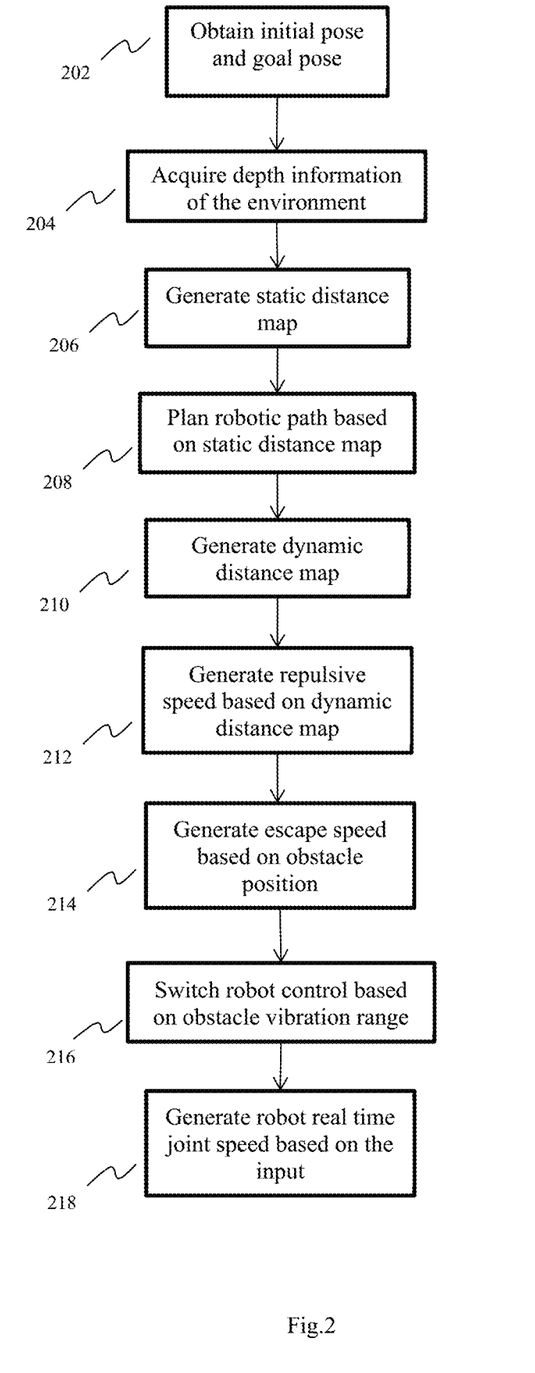
FIG. 2 depicts an exemplary flow diagram for robot path planning and collision avoidance.

FIG. 2 illustrates an exemplary flow diagram for robot path planning and collision avoidance, according to one embodiment of the present teaching. At step 202, the initial pose and goal pose of the robot may be obtained. At step 204, the depth information of the environment may be obtained by a depth camera 102. The depth information may be converted to the 3D structural information of the environment. At step 206, the static distance map may be generated for static obstacles based on the depth information. This may correspond to a time instance at the start. At step 208, a collision-free robotic trajectory may be obtained by applying a path planning algorithm based on the static distance map. One embodiment of the path-planning algorithm will be described later in the disclose. At step 210, a dynamic distance map may be generated. This may correspond to time instances after the start. The dynamic distance map may be generated at a rate proportional to the speed of motion for dynamic obstacles, such that the dynamic distance map may capture the distance information between the robot and the dynamic obstacles at an acceptable speed. At step 212, a repulsive speed of the robot may be computed by using minimum distances between the robot and dynamic obstacle points based on the dynamic distance map. At step 214, the relative positions between robot and obstacles may be used to compute an escape speed to help the robot escape from being trapped by obstacles. The robot is said to be trapped by obstacles when the robot is unable to move away from or escape from the obstacles to avoid a collision because the summation of repulsive speeds generated by individual obstacle points is zero. At step 216, the vibration range of obstacle points may be determined and used by the obstacle vibration-based control switch unit 120 to switch between the path planning unit and the repulsive speed generation unit. At step 218, the robot real time joint speed may be generated based on trajectory planning algorithms. Trajectory planning is to find a continuous trajectory of motion instead of discreate positions obtained by path planning. The input of the robot joint speed generation unit 122 may be a combination of joint space trajectory and repulsive joint speed. The trajectory planning algorithm may be a polynomial-based or spline-based algorithm.

Figure 3:
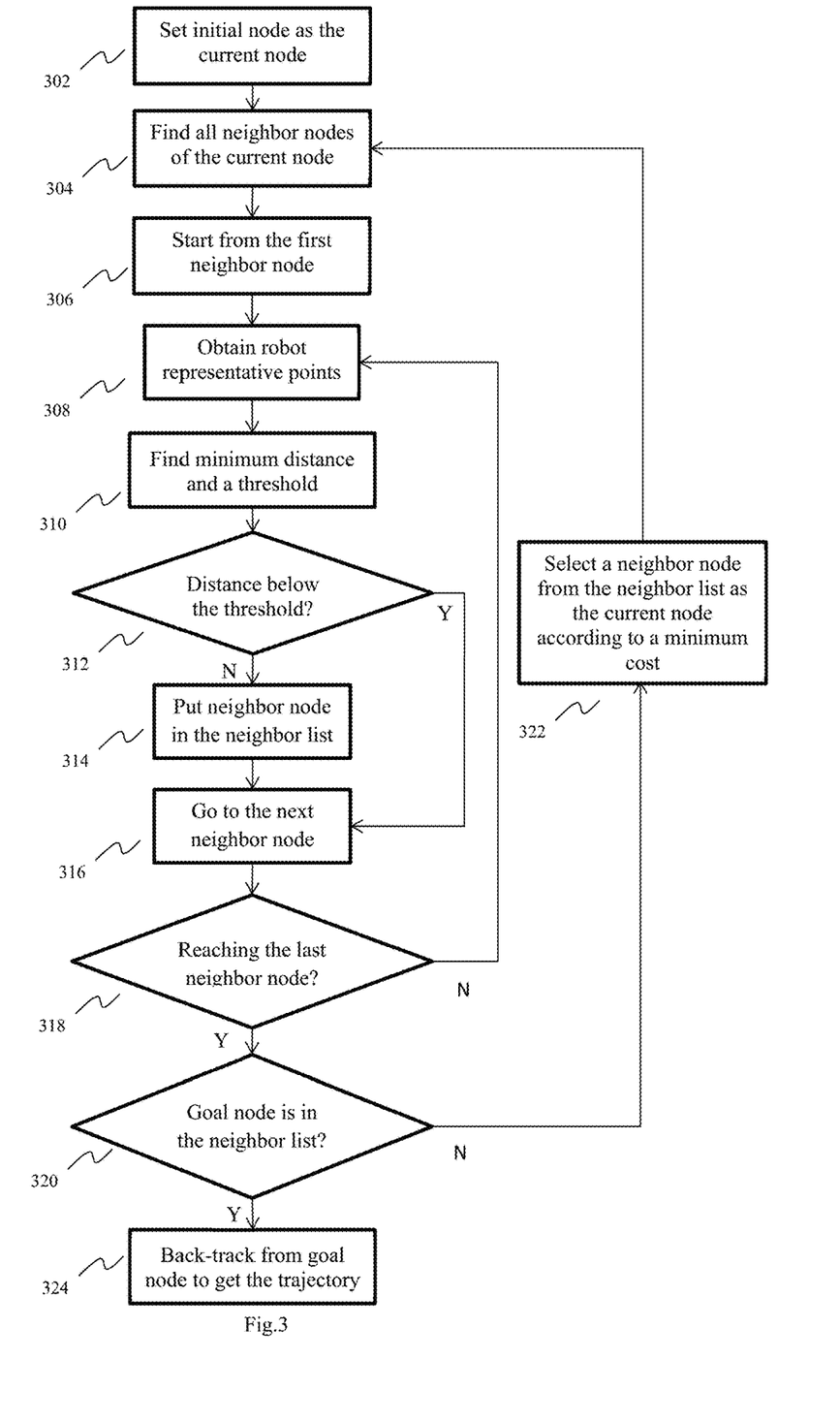
FIG. 3 depicts an exemplary flow diagram for static distance map-based robot path planning.

FIG. 3 illustrates an exemplary flow diagram of robot path planning of step 208 based on the static distance map. At step 302, the initial node may be set as current node. At step 304, the neighbor nodes $N=\{N_1, N_2, \ldots N_K\}$ of the current node may be obtained, where K is the number of neighboring nodes. The current node may be set as the parent node of the neighbor nodes and the neighbor nodes may be set as the children nodes of the current node. The parent node of the initial node and the children nodes of the goal node may be set as empty. During path planning, if the goal node becomes one of the neighbor nodes N of a node, the planning finishes, and the robot trajectory may be obtained by back-tracking from the goal node through the parent nodes until the initial node is reached. At step 306, the path planning search starts with the first neighbor node $N_1$. At step 308, the number of robot representative points may be calculated based on the minimum distance between the parent node and the obstacles. Intuitively, the use of dynamic number of representative points may be interpreted as follows. When the robot is away from the obstacles, the number of robot representative points may be smaller so that the collision detection may be performed on a smaller amount of points on the robot to reduce the planning time. As the robot moves closer to the obstacles, the number of robot representative points may be increased so that the collision detection may become more accurate to allow the robot to go through narrow paths in between-obstacles. The representative points may be equally distributed along the robot surface or follow a specific distribution pattern. The details for obtaining robot representative points based on the point number are explained later. For the initial node, the minimum distance may have not been obtained before. Therefore, the number of representative points may be set as a pre-defined maximum value $n_{max}$. The maximum value $n_{max}$ may be obtained by adding the maximum number of representative points for each robot link. The maximum number of representative points for each robot link may be expressed as a function of the length of the robot link as $$n_l = L(l)$$

Where l is the length of the robot link and L(l) is a function of l. An exemplar embodiment of the linear function may take the following form $$L(l) = \frac{l}{\sigma}$$

Where $\sigma$ is the resolution of the robot link which may be determined based on the application. Intuitively, the resolution may be small if the robot workspace is surrounded by obstacles so that the representative points of the robot are dense enough to perform accurate collision detection and path planning.

For the nodes other than the initial node, the number of representative points may be expressed as a function of the minimum distance from the parent node to the obstacles as $$n = w(d_p)$$

Where $d_p$ is the minimum distance from robot representative points at the parent node to the obstacles, and $w(d_p)$ is a function of $d_p$. The distance $d_p$ may be defined as the Euclidian distance in the Cartesian space, while the function $w(c_n)$ may be a linear or parabolic function of the distance $d_p$. An exemplar embodiment of the linear function may take the following form $$w(d_p) = n_{max} \cdot \frac{d_{max} - d_p}{d_{max}}$$

Where $n_{max}$ is the maximum number of robot representative points and $d_{max}$ is the robot maximum reachability, i.e., the maximum reachable distance.

At step 310, the minimum distance between each representative point and the obstacles may be obtained from static distance map. A threshold t may be determined and expressed as a function of the minimum distance from robot representative points to the obstacles as $$t = T(d)$$

Where d is the minimum distance between robot and static obstacles obtained at step 310, and T(d) is a function of d. The function T(d) may be a linear or parabolic function of the distance d. An exemplar embodiment of the linear function may take the following form $$T(d) = \frac{d}{d_{max}}$$

Where $d_{max}$ is described above.

At step 312, it is checked that if the minimum distance obtained is below the threshold t. Intuitively, when the threshold is small, the robot may be very close to the obstacle surface. Thus, if the minimum distance is greater than the threshold, that neighbor node may be put into the neighbor list at step 314 for further examination later. Otherwise, the current node may be discarded (meaning a high risk of collision), and the neighbor index may be incremented by 1 to go to the next neighbor node at step 316.

At step 318, it is checked if the current node has reached the last neighboring node $N_K$. If not, the above process may be repeated. Otherwise, it is checked if the goal node is in the neighbor list at step 320. If the goal node is not in the neighbor list, a cost may be calculated based on a cost function for each neighbor node in the list. The neighbor node of the minimum cost may be selected from the neighbor list and set as the current node at step 322 to repeat the path planning process. By one embodiment, the details of the cost function are described below. Suppose a trajectory includes N nodes, 1, 2, ..., N. At any intermediate node n, the cost from the starting node to the n-th node may be denoted by g(n). The cost g(n) may be defined as the Euclidian distance between the joint angles (i.e., configuration of the end-effector) at the initial node and those at the n-th node. Another cost that provides an estimate of the cost from the n-th node to the goal node(N) may be denoted by h(n). The cost h(n) may be defined as the Euclidian distance between the joint angles at the n-th node and those at node N (the goal node). The total cost function f(n) at the n-th node may take the form of:

$$f(n) = g(n) + h(n)$$

If the goal node is in the neighbor list as checked at step 320, the robot trajectory may be obtained by backtracking from the goal node through parent nodes to the initial node at step 324.

Figure 4:
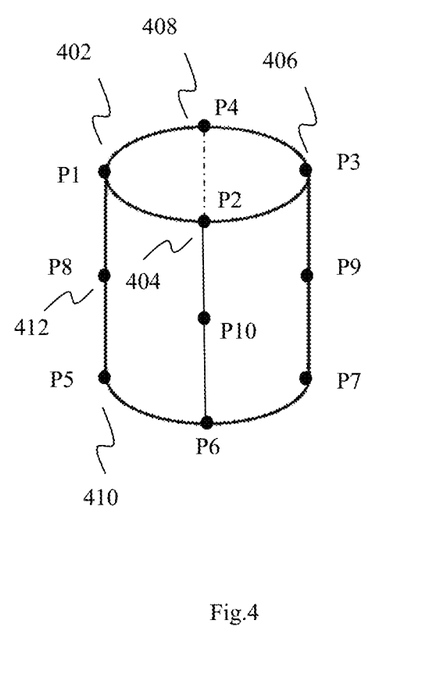
FIG. 4 depicts an example of finding robot representative points.

FIG. 4 illustrates one example of finding robot's representative points (step 308). In the figure, the cylinder represents a link of the robot arm. Suppose the number of representative points is twelve and they are equally distributed. One embodiment of the distribution is to put one third of the representative points on the top surface, one third on the bottom surface, and one third on the side surface of the link, respectively. On the top surface of the link, there may be four representative points p1(402), p2(404), p3(406), p4(408) equally distributed at 90° interval. Similarly, there may be four corresponding points on the bottom surface. For example, point p5(410) corresponds to point p1(402). The representative points on the side surface may be determined by dividing the length of the cylinder by a positive number (here two). As a result, there may be 4 points on the side surface (P8, P9, P10 and one behind the cylinder not visible). All the above points may be used as the robot representative points.

Figure 5:
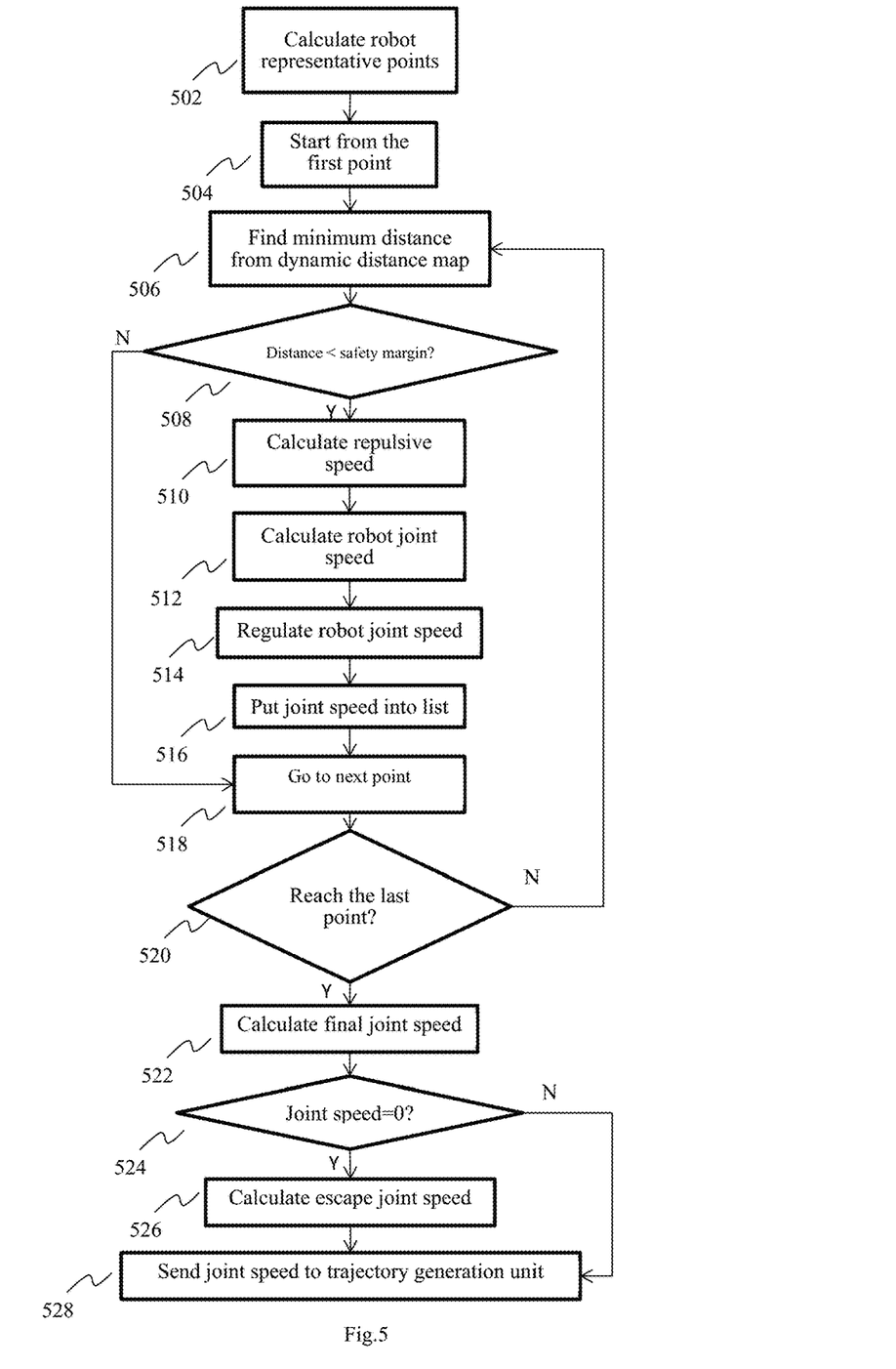
FIG. 5 depicts an exemplary flow diagram for generating repulsive speed.

FIG. 5 illustrates an exemplary flow of step 212 for generating the repulsive speed based on the dynamic distance map. At step 502, the robot representative points may be obtained in the same way as described above. At step 504, the first robot representative point may be selected. At step 506, the minimum distance between the first robot representative point and the obstacles may be obtained from the dynamic distance map. The obstacles in the dynamic distance map may be based on a classification of dynamic obstacles described in FIG. 8 of the present disclosure. At step 508, it may be checked if the minimum distance is smaller than a safety margin s. If not, the robot representative point index may be incremented by 1 to go to the next point at step 518. Otherwise, at step 510, a repulsive speed at the current representative point may be calculated based on the Artificial Potential Field (APF) algorithm. Suppose $p_r$ is the current representative point, $p_o$ is the closest obstacle point. The direction of the repulsive speed may be determined as a vector from $p_o$ to $p_r$ and the magnitude v may take the following form $$v = \frac{s - d}{s}$$

Where s is a safety margin (the minimum distance allowed between the robot and obstacles), and d is the Euclidean distance between $p_r$ and $p_o$. The representative points that are within the safety margin s will be called the critical points of the robot. The closest point on the obstacle to a robot critical point is called the critical point of obstacle.

There may be multiple repulsive speeds generated corresponding to multiple robot critical points.

At step 512, the robot repulsive joint speed may be computed from the above repulsive speed as $$\dot{\theta} = V(v)$$

Where v is the repulsive speed, and V(v) is a function of v. An exemplar embodiment of the function V(v) may take the following form $$V(v) = J^{-1} v$$

Where J is the partial Jacobian matrix of the robot at the current representative point.

At step 514, the robot repulsive joint speed may be reduced if it is larger than the maximum safety speed $v_s$. The safety speed of a robot arm may be referred to as the maximum speed of the robot arm that is allowed for an application. The element with largest magnitude in the matrix $\dot{\theta}$ may be determined. The joint speed may be re-computed as a function of the magnitude and the safety speed $v_s$ as $$\dot{\theta} = R(v_{max}, v_s)$$

Where $v_{max}$ is the largest magnitude, and R is a function of $v_{max}$ and $v_s$. The function $R(v_{max}, v_s)$ may be a linear or parabolic function of the magnitude $v_{max}$ and safety speed $v_s$. An exemplar embodiment of the function $R(v_{max}, v_s)$ may take the following form $$R = \frac{v_{max}}{v_s} \dot{\theta}$$

At step 516, the joint speed may be saved in a list L. At step 518, the robot representative point index may be incremented by 1 to go to the next point. At step 520, it is checked if the next point has reached the final point. If not, the above process may be repeated. Otherwise, the final robot joint speed is calculated by adding the repulsive joint speeds in the list L at step 522. The robot final joint speed may be expressed as a function of individual joint speeds in the list L as $$\dot{\theta}_{rep} = \sum_{i=0}^{n} \dot{\theta}_i$$

Where n is the total number of joint speeds in the list L.

At step 524, it is checked if the final robot joint speed $\dot{\theta}_{rep}$ is zero. If not, the joint speed may be sent to robot joint speed generation unit 122 at step 528. Otherwise, an escape joint speed may be calculated at step 526, so that the robot may be able to escape from the trap of obstacles.

Figure 6:
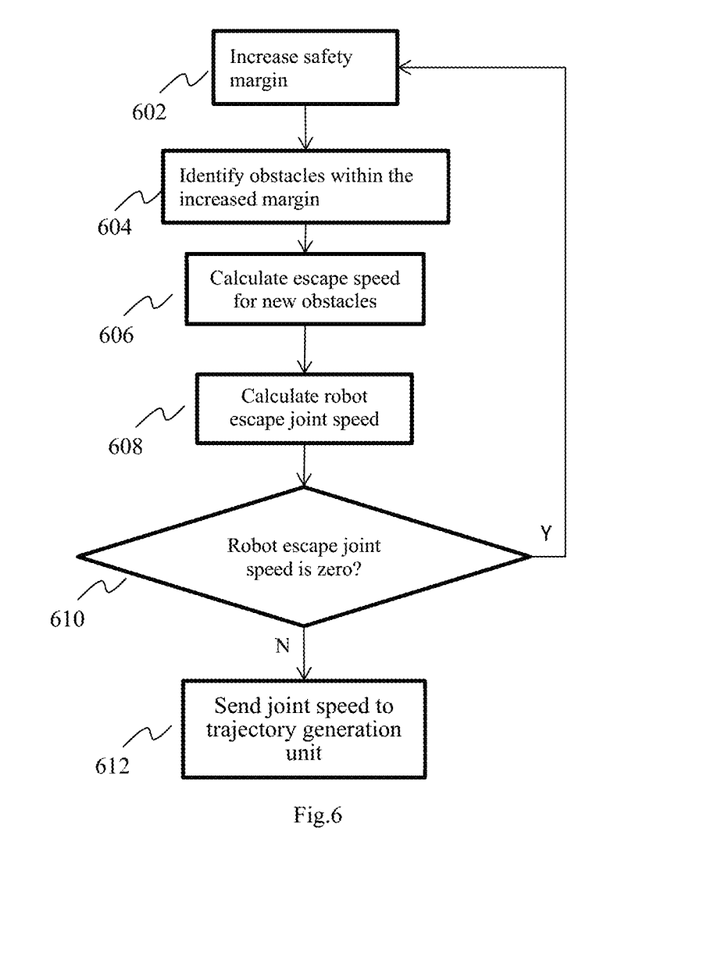
FIG. 6 depicts an exemplary flow diagram for generating escape speed.

FIG. 6 illustrates an exemplary flow for step 526 for computing the escape speed. The obstacle trap may occur when the addition of all joint speeds in list L is zero. In such cases, the robot may be trapped in the middle of multiple obstacles without being able to avoid a possible collision with them. At step 602, the safety margin s may be increased to include more obstacles near the robot. The amount of increment may be determined empirically. At step 604, the obstacles within the safety margin may be identified. At step 606, the repulsive speed for avoiding the new obstacles may be calculated. This will serve as the escape speed for escaping the obstacle trap. At step 608, the escape joint speed may be calculated from the repulsive speed as explained before. At step 610, it may be checked if the escape joint speed is zero. If not, the escape joint speed may be sent to joint speed generation unit 122 at step 612. Otherwise, the above process may be repeated by increasing the safety margin (step 602) until a non-zero escape speed is found.

Figure 7:
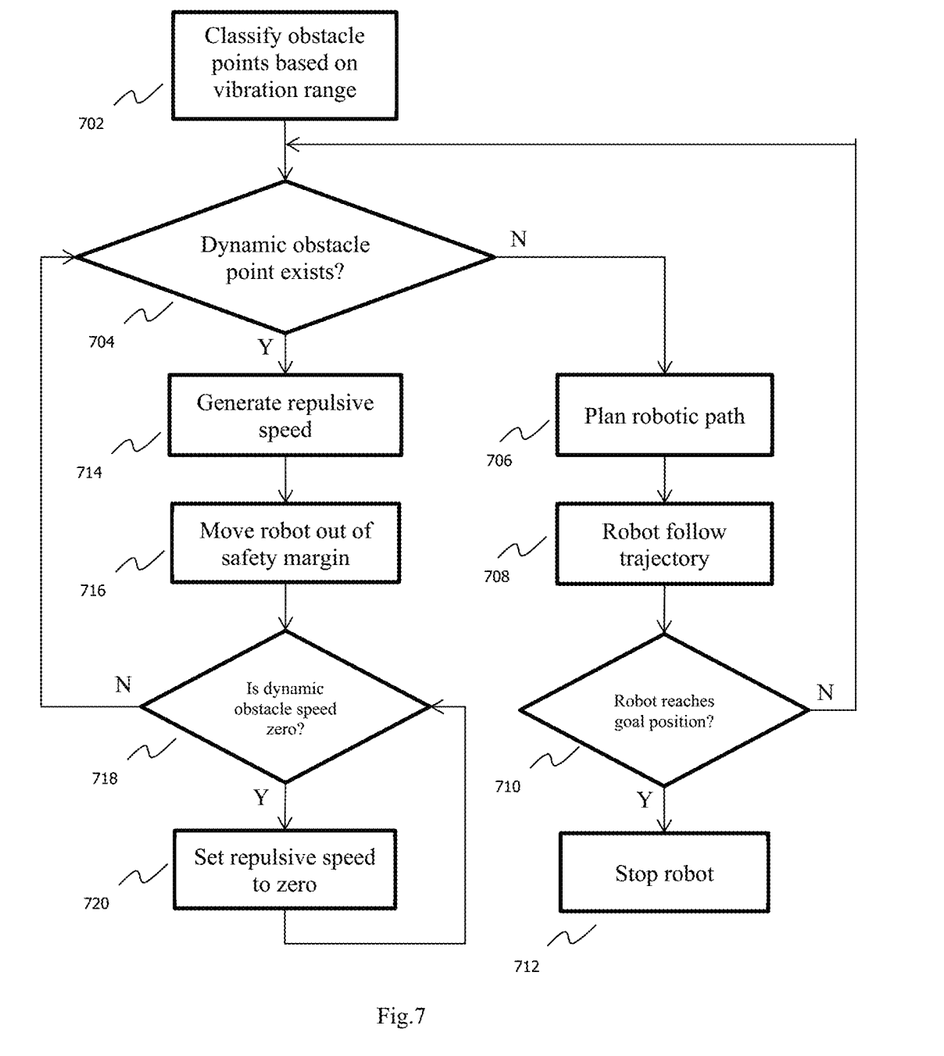
FIG. 7 depicts an exemplary flow diagram for switching control between path planning and repulsive speed generation.

FIG. 7 illustrates an exemplary flow of step 216 for control switch based on obstacle vibration range. At step 702, the obstacle points within robot safety margin may be obtained based on the dynamic distance map and classified as static obstacle points or dynamic obstacle points based on their vibration range. The details for the classification will be described later. At step 704, it is checked if dynamic obstacle points exist in the robot workspace. If not, the path planning unit may generate robot trajectory at step 706. At step 708, the robot may follow the planned trajectory. At step 710, it may be checked if the robot is at the goal pose. If it is, the robot may stop at step 712. Otherwise, it may be checked again if any dynamic obstacles are within robot safety margin. Please note that the existence of dynamic objects is time-dependent, meaning that new dynamic objects may appear at any time. If any dynamic obstacles exist, the repulsive speed may be generated at step 714. At step 716, the robot may move away with the repulsive speed so that the dynamic obstacles are out of safety margin. At step 718, it is checked if the speed of dynamic obstacles is zero. If not, the process of checking for existence of dynamic obstacles may be repeated. Otherwise, the repulsive speed may be set to zero at step 720 until the dynamic obstacle moves again. The speed of dynamic obstacles may be checked through the dynamic distance map. If the minimum distance from the dynamic obstacles does not change or only change within a small range, the speed of dynamic obstacles may be considered zero.

Figure 8:
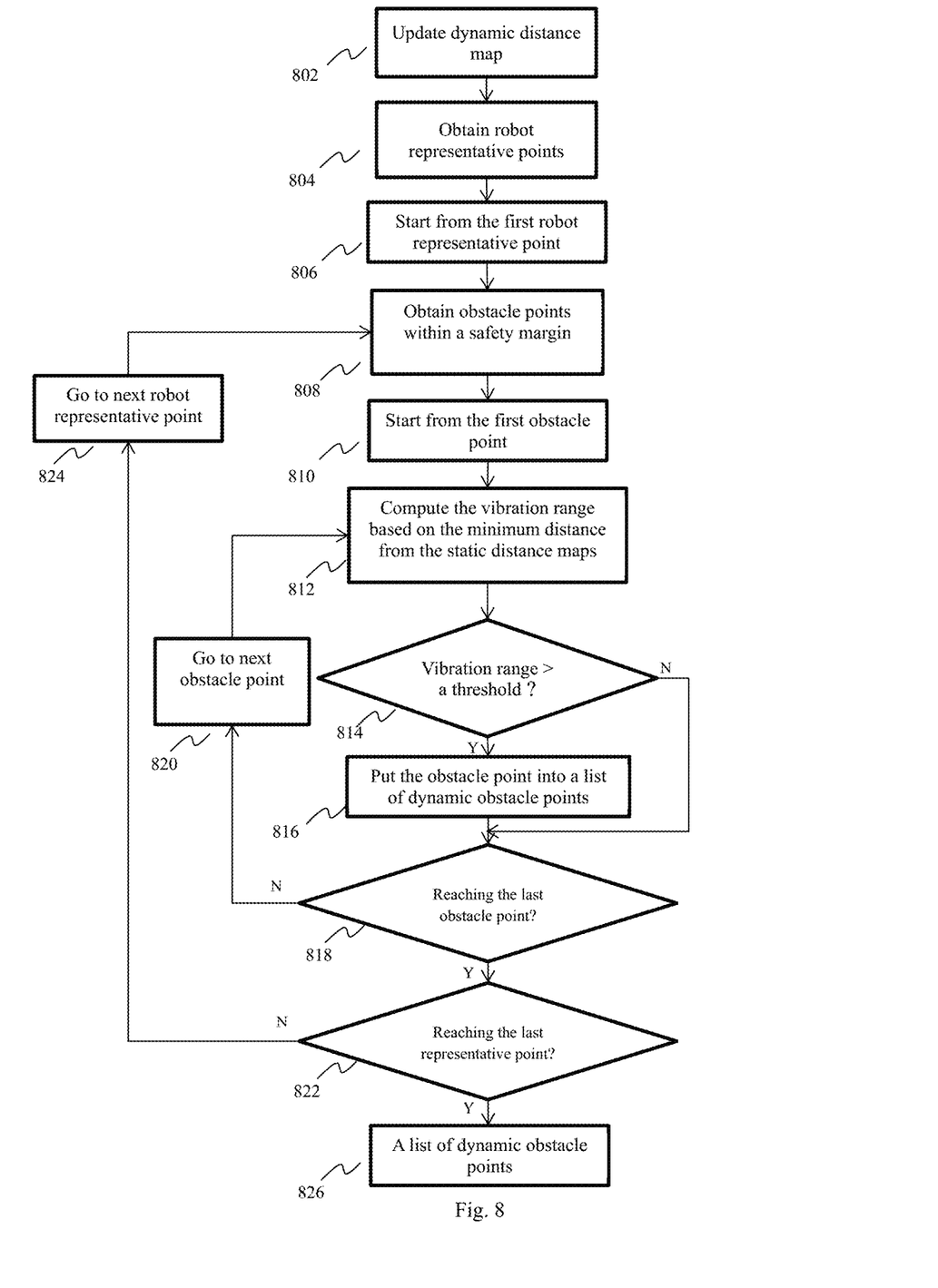
FIG. 8 depicts an exemplary flow diagram for classifying dynamic obstacle points.

FIG. 8 illustrates an exemplary flow of step 702 for classifying obstacle points within the robot safety margin. At step 802, the dynamic distance map may be updated. At step 804, the maximum number of robot representative points may be generated as described before. At step 806, the detection of dynamic obstacle points may start from the first robot representative point (the order may be random). At step 808, the obstacle points that are within the robot safety margin may be obtained. This may be performed by reading the values from the dynamic distance map at the locations of the robot representative points and checking the values against the safety margin. At step 810, the first obstacle point is picked. At step 812, the minimum distance in the static distance map may be obtained at the location of the obstacle point. That minimum distance may be considered as the vibration range of the obstacle point. Intuitively, this minimum distance reflects the possible range of motion for vibrating obstacles. At step 814, it is checked if the vibration range is smaller than a threshold. The threshold may be the maximum possible vibration range of a static obstacle. The maximum vibration range of static obstacles may be determined based on experiments. If the vibration range is larger than the threshold, the obstacle point may be classified as a dynamic obstacle point and put into a dynamic point list at step 816. Otherwise, it is checked if the obstacle point has reached the last obstacle point at step 818. If not, the obstacle point index may be incremented by 1 at step 820 and the above process may be repeated. At step 822, it is checked if the representative point has reached the last representative point. If not, the robot representative point index may be incremented by 1 at step 824 and the above process may be repeated. Otherwise, the dynamic point list may be obtained at step 826. If the list is not empty, it may be used to generate the robot repulsive speed as depicted in FIG. 7.

Intuitively, the classification may be interpreted as follows. If an obstacle point is vibrating within a small range at a fixed position, such as human breathing, it may be perceived as a static obstacle point instead of a dynamic obstacle point, so that no repulsive speed may be generated to move the robot away from the obstacle. To make the robot move according to the patient breathing may cause negative impacts on the stability of a procedure.

Figure 9:
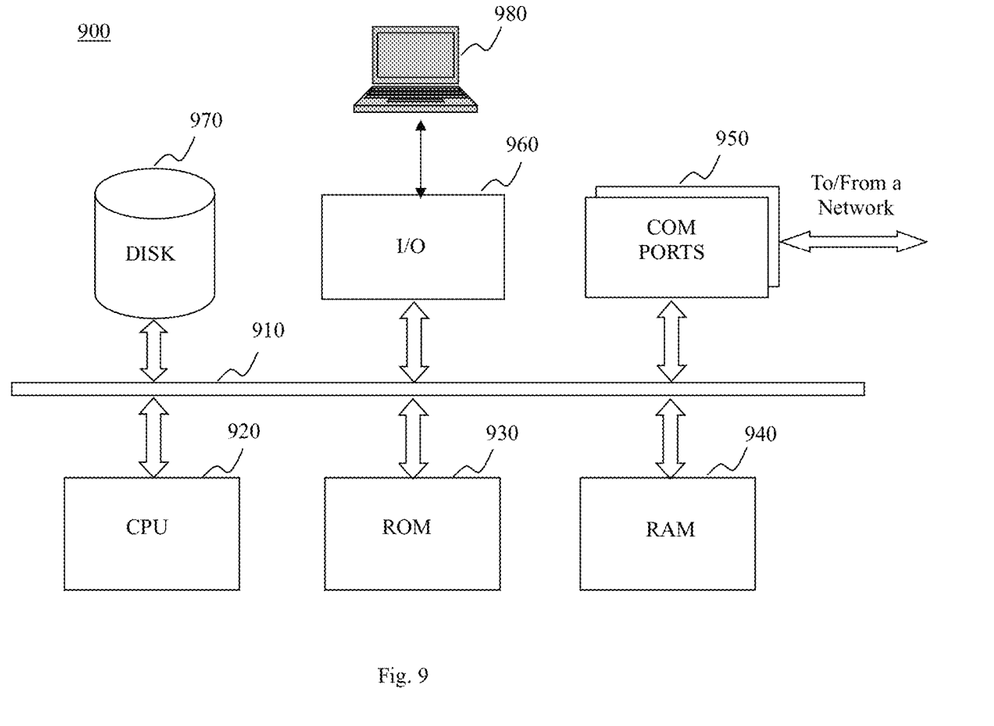
FIG. 9 depicts an architecture of a computer which can be used to implement a specialized system incorporating the present teaching.

FIG. 9 is an illustrative diagram of an exemplary computer system architecture, in accordance with various embodiments of the present teaching. Such a specialized system incorporating the present teaching has a functional block diagram illustration of a hardware platform which includes user interface elements. Computer 900 may be a general-purpose computer or a special purpose computer. Both can be used to implement a specialized system for the present teaching. Computer 900 may be used to implement any component(s) described herein. For example, the present teaching may be implemented on a computer such as computer 900 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 900, for example, may include communication ports 950 connected to and from a network connected thereto to facilitate data communications. Computer 900 also includes a central processing unit (CPU) 920, in the form of one or more processors, for executing program instructions. The exemplary computer platform may also include an internal communication bus 910, program storage and data storage of different forms (e.g., disk 970, read only memory (ROM) 930, or random access memory (RAM) 940), for various data files to be processed and/or communicated by computer 900, as well as possibly program instructions to be executed by CPU 920. Computer 900 may also include an I/O component 960 supporting input/output flows between the computer and other components therein such as user interface elements 980. Computer 900 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer of the robot's motion planning system into the hardware platform(s) of a computing environment or other system implementing a computing environment or similar functionalities in connection with path planning. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the robot's motion planning system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method implemented on a machine having at least one processor, storage, and a communication platform capable of connecting to a network for robot path planning, the method comprising:
 obtaining, at a first time instant, depth information of a plurality of obstacles in an environment of a robot;
 generating a static distance map based on the depth information of the plurality of obstacles;

computing, in accordance with a model, a path for the robot based on the static distance map;

obtaining, at a second time instant, depth information of one or more obstacles in the environment of a robot;

generating a dynamic distance map based on the one or more obstacles;

for each of the one or more obstacles that satisfy a condition computing a vibration range of the obstacle based on a position of the obstacle and the static distance map, and classifying the obstacle as one of a dynamic obstacle and a static obstacle based on a criterion associated with the vibration range; and calculating a repulsive speed of the robot based on the dynamic distance map, the repulsive speed corresponding to a speed at which the robot deviates from the path to avoid each of the dynamic obstacles.

2. The method of claim 1, wherein the condition corresponds to an obstacle being within a safety margin with respect to the robot, the safety margin being determined based on the dynamic distance map.

3. The method of claim 1, wherein
in response to the vibration range of the obstacle being greater than a threshold, the obstacle is classified as a dynamic obstacle, and in response to the vibration range being lower than the threshold, the obstacle is classified as a static obstacle.

4. The method of claim 1, wherein the robot is a robotic arm including a plurality of segments, and wherein the repulsive speed of the robot is computed with respect to each of the one or more obstacles that satisfy the condition.

5. The method of claim 4, wherein the repulsive speed of the robot with respect to a particular obstacle is computed based on calculating an individual repulsive speed of each segment of the robotic arm, the individual repulsive speed being calculated based on a distance of the segment from the particular obstacle.

6. The method of claim 5, further comprising:
obtaining the repulsive speed of the robot as a summation of the individual repulsive speeds of the plurality of segments;
determining whether the repulsive speed of the robot satisfies a speed condition; and
in response to the repulsive speed of the robot satisfying the speed condition, calculating an escape speed of the robot.

7. The method of claim 6, wherein the speed condition corresponds to the repulsive speed of the robot being zero.

8. A non-transitory machine-readable medium having information recorded thereon for robot path planning, wherein the information, when read by a machine, causes the machine to perform the steps of:
obtaining, at a first time instant, depth information of a plurality of obstacles in an environment of a robot;
generating a static distance map based on the depth information of the plurality of obstacles;
computing, in accordance with a model, a path for the robot based on the static distance map;
obtaining, at a second time instant, depth information of one or more obstacles in the environment of a robot;
generating a dynamic distance map based on the one or more obstacles;
for each of the one or more obstacles that satisfy a condition computing a vibration range of the obstacle based on a position of the obstacle and the static distance map, and classifying the obstacle as one of a dynamic obstacle and a static obstacle based on a criterion associated with the vibration range; and calculating a repulsive speed of the robot based on the dynamic distance map, the repulsive speed corresponding to a speed at which the robot deviates from the path to avoid each of the dynamic obstacles.

9. The medium of claim 8, wherein the condition corresponds to an obstacle being within a safety margin with respect to the robot, the safety margin being determined based on the dynamic distance map.

10. The medium of claim 8, wherein
in response to the vibration range of the obstacle being greater than a threshold, the obstacle is classified as a dynamic obstacle, and in response to the vibration range being lower than the threshold, the obstacle is classified as a static obstacle.

11. The medium of claim 8, wherein the robot is a robotic arm including a plurality of segments, and wherein the repulsive speed of the robot is computed with respect to each of the one or more obstacles that satisfy the condition.

12. The medium of claim 11, wherein the repulsive speed of the robot with respect to a particular obstacle is computed based on calculating an individual repulsive speed of each segment of the robotic arm, the individual repulsive speed being calculated based on a distance of the segment from the particular obstacle.

13. The medium of claim 12, further comprising:
obtaining the repulsive speed of the robot as a summation of the individual repulsive speeds of the plurality of segments;
determining whether the repulsive speed of the robot satisfies a speed condition; and
in response to the repulsive speed of the robot satisfying the speed condition, calculating an escape speed of the robot.

14. The medium of claim 13, wherein the speed condition corresponds to the repulsive speed of the robot being zero.

15. A system for robot path planning, comprising:
a processor configured to
obtain, at a first time instant, depth information of a plurality of obstacles in an environment of a robot;
generate a static distance map based on the depth information of the plurality of obstacles;
compute, in accordance with a model, a path for the robot based on the static distance map;
obtain, at a second time instant, depth information of one or more obstacles in the environment of a robot;
generate a dynamic distance map based on the one or more obstacles;
for each of the one or more obstacles that satisfy a condition compute a vibration range of the obstacle based on a position of the obstacle and the static distance map, and classify the obstacle as one of a dynamic obstacle and a static obstacle based on a criterion associated with the vibration range; and calculate a repulsive speed of the robot based on the dynamic distance map, the repulsive speed corresponding to a speed at which the robot deviates from the path to avoid each of the dynamic obstacles.

16. The system of claim 15, wherein the condition corresponds to an obstacle being within a safety margin with respect to the robot, the safety margin being determined based on the dynamic distance map.

17. The system of claim 15, wherein
in response to the vibration range of the obstacle being greater than a threshold, the obstacle is classified as a dynamic obstacle, and
in response to the vibration range being lower than the threshold, the obstacle is classified as a static obstacle.

18. The system of claim 15, wherein the robot is a robotic arm including a plurality of segments, and wherein the repulsive speed of the robot is computed with respect to each of the one or more obstacles that satisfy the condition.

19. The system of claim 18, wherein the repulsive speed of the robot with respect to a particular obstacle is computed based on calculating an individual repulsive speed of each segment of the robotic arm, the individual repulsive speed being calculated based on a distance of the segment from the particular obstacle.

20. The system of claim 19, wherein the processor is further configured to:
obtain the repulsive speed of the robot as a summation of the individual repulsive speeds of the plurality of segments;
determine whether the repulsive speed of the robot satisfies a speed condition; and
in response to the repulsive speed of the robot satisfying the speed condition, calculate an escape speed of the robot.

* * * * *